(12) United States Patent
Tougher et al.

(10) Patent No.: US 11,853,185 B2
(45) Date of Patent: Dec. 26, 2023

(54) SERVER NETWORK RESOURCE REALLOCATION

(71) Applicant: Microsoft Technology Licensing, LLC, Redmond, WA (US)

(72) Inventors: Robert Martin Tougher, Snoqualmie, WA (US); Randy Lehner, Redmond, WA (US); Daniel Christopher Gidycz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 610 days.

(21) Appl. No.: 17/107,129

(22) Filed: Nov. 30, 2020

(65) Prior Publication Data

US 2022/0171690 A1    Jun. 2, 2022

(51) Int. Cl.
*G06F 11/30* (2006.01)
*G06F 11/07* (2006.01)
*G06F 11/32* (2006.01)

(52) U.S. Cl.
CPC ........ *G06F 11/3024* (2013.01); *G06F 11/076* (2013.01); *G06F 11/3017* (2013.01); *G06F 11/3075* (2013.01); *G06F 11/328* (2013.01)

(58) Field of Classification Search
CPC .............. G06F 11/3024; G06F 11/076; G06F 11/3017; G06F 11/3075; G06F 11/328
See application file for complete search history.

(56) References Cited

U.S. PATENT DOCUMENTS

| 7,469,285 B2 | 12/2008 | Poortman |
| 9,003,292 B2 | 4/2015 | Smith et al. |
| 9,654,367 B2 | 5/2017 | Hillier |
| 10,411,977 B2 | 9/2019 | Deshpande et al. |
| 10,936,585 B1 * | 3/2021 | Echeverria ............... G06N 5/00 |

(Continued)

OTHER PUBLICATIONS

B. D. Semeraro, R. Sisneros, J. Fullop and G. H. Bauer, "It takes a village: Monitoring the blue waters supercomputer," 2014 IEEE International Conference on Cluster Computing (CLUSTER), Madrid, Spain, 2014, pp. 392-399, doi: 10.1109/CLUSTER.2014.6968671 (Year: 2014).*

(Continued)

*Primary Examiner* — Raymond L Nimox
(74) *Attorney, Agent, or Firm* — Schwegman Lundberg & Woessner, P.A.

(57) ABSTRACT

A system and method for determining and generating a visualization of processor utilization is described. The system accesses a source data set that indicates processor utilization rates of a plurality of servers over a plurality of sampling periods. The system defines a target data set that includes a plurality of processor utilization range buckets corresponding to the plurality of sampling periods. The system updates the target data set based on the source data set. A graphical user interface (GUI) is generated based on the updated target data set and includes a stacked area chart indicating percentages of samples corresponding to the processor utilization range buckets over time. The system distributes, based on the updated target data set, a load of from a first server to a second server based on the processor utilization range bucket of the first server and the processor utilization range bucket of the second server.

20 Claims, 12 Drawing Sheets

(56) References Cited

U.S. PATENT DOCUMENTS

| | | | |
|---|---|---|---|
| 11,574,242 B1* | 2/2023 | Burke | G06F 16/2477 |
| 2014/0033055 A1* | 1/2014 | Gardner | G06F 11/3409 |
| | | | 715/736 |
| 2015/0222720 A1* | 8/2015 | Broda | H04L 43/10 |
| | | | 709/203 |
| 2016/0103559 A1 | 4/2016 | Oliner et al. | |
| 2018/0025051 A1* | 1/2018 | Tsumura | G06F 3/04847 |
| | | | 715/771 |
| 2018/0113578 A1* | 4/2018 | Yoon | H04L 43/045 |
| 2018/0218285 A1* | 8/2018 | Oliner | G06N 5/04 |
| 2019/0391836 A1* | 12/2019 | Higuchi | G06F 9/5088 |
| 2020/0257680 A1* | 8/2020 | Danyi | G06F 11/302 |

OTHER PUBLICATIONS

R. E. Hiromoto and T. Veluppillai, "A tablet-class cloud architecture for remote execution and interactive data analysis," 2015 IEEE 8th International Conference on Intelligent Data Acquisition and Advanced Computing Systems: Technology and Applications (IDAACS), Warsaw, Poland, 2015, pp. 75-80 (Year: 2015).*

R. G. Athreya and S. Thanukrishnan, "A Public Cloud Based SOA Workflow for Machine Learning Based Recommendation Algorithms," 2015 IEEE International Conference on Smart City/SocialCom/SustainCom (SmartCity), Chengdu, China, 2015, pp. 988-995, doi: 10.1109/SmartCity.2015.199 (Year: 2015).*

"Business Service CPU and Memory Heat Map", Retrieved from: https://techdocs.broadcom.com/us/en/ca-enterprise-software/it-operations-management/capacity-management/2-9-4/building/current-capacity-reporting/exception-reports/business-service-cpu-and-memory-heat-map.html, Retrieved Date: Oct. 3, 2020, 2 Pages.

"Getting Statistics for a Specific Resource", Retrieved from: https://web.archive.org/web/20171223075122/http:/docs.aws.amazon.com/AmazonCloudWatch/latest/monitoring/US_SingleMetricPerInstance.html, Dec. 23, 2017, 5 Pages.

"Utilization Heat Maps", Retrieved from: https://web.archive.org/web/20200818110224/http:/www.brendangregg.com/HeatMaps/utilization.html, Aug. 18, 2020, 24 Pages.

Mouzakitis, Evan, "How to collect Windows Server 2012 metrics", Retrieved from: https://www.datadoghq.com/blog/collect-windows-server-2012-metrics/, Oct. 20, 2016, 18 Pages.

"International Search Report and Written Opinion Issued in PCT Application No. PCT/US21/054885", dated Jan. 28, 2022, 14 Pages.

* cited by examiner

SERVER NETWORK RESOURCE REALLOCATION

TECHNICAL FIELD

The subject matter disclosed herein generally relates to a system for computing and generating a server utilization resource visualization and reallocating server resources. Specifically, the present disclosure addresses systems and methods for computing a data set used to generate the visualization, indicate areas of under-utilization, and reallocate server resources.

BACKGROUND

A network of servers such as a server farm can include servers located in different geographical regions. As a result, the load of each server greatly varies throughout the day. An administrator of the server farm may find it difficult to assess resource utilization because the administrator typically accesses different applications and visualization tools that can be too high level or too detailed. On the one hand, visualization tools typically illustrate resource utilization averages and maximums without providing further details. On the other hand, other visualization tools that provide many details can overwhelm the administrator and drown out the pertinent areas of under-utilization and over-utilization of the servers in the server farm.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
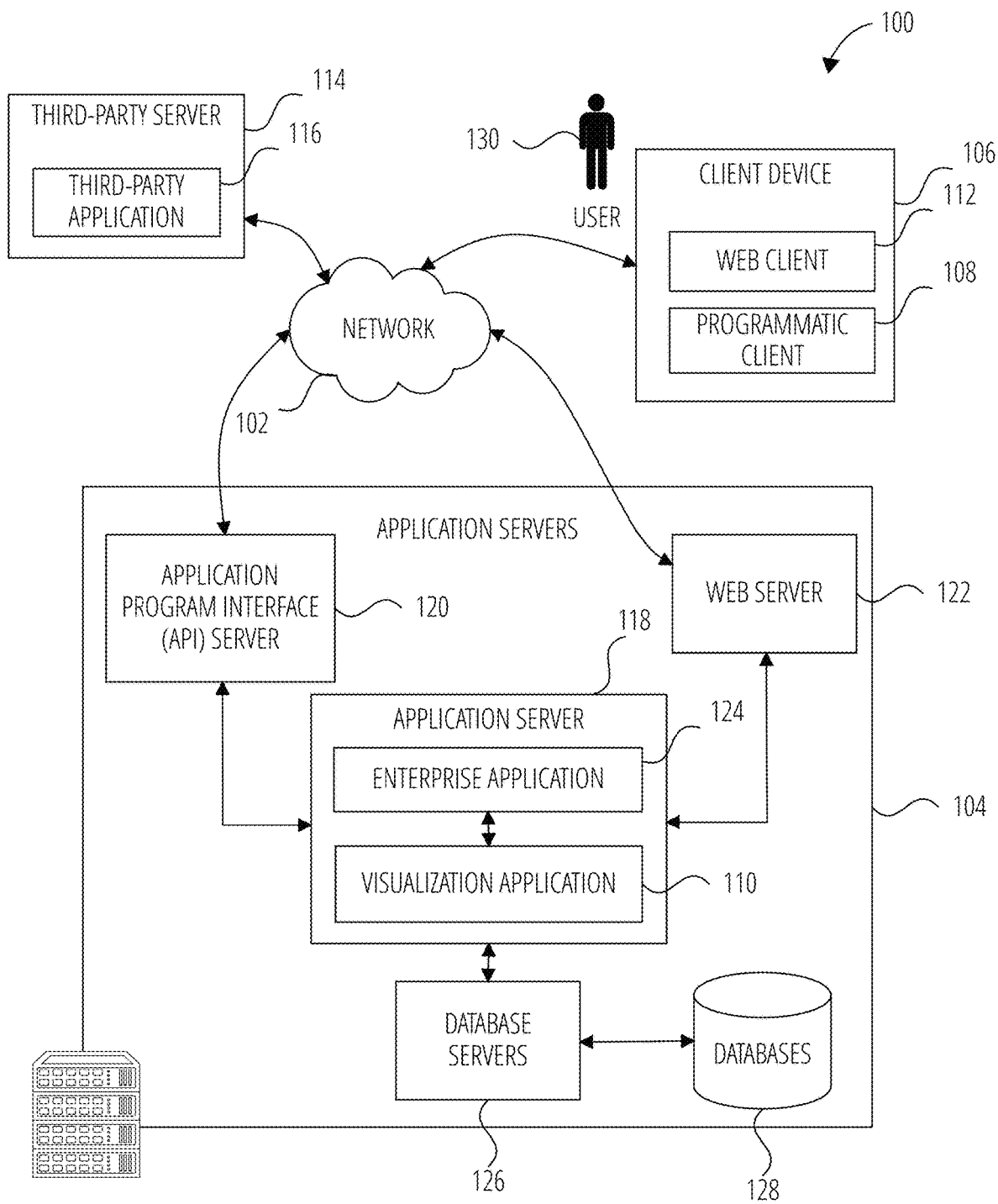
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

It is often difficult to visualize and summarize the resource utilization of servers across many data centers and regions. On the one hand, if the visualization is illustrated at a high level, details of individual server utilization can be lost. On the other hand, if the visualization includes too many details, high-level trends can be difficult to identify. As such, one drawback of a too high level visualization or a too detailed visualization is the difficulty in identifying pockets of under-utilized capacity across the different servers.

The present application describes a method for computing processor utilization rates of a network of servers (also referred to as a server farm, a server fleet) and generating a visualization of the computed processor utilization rates. In one example embodiment, the visualization system generates a graphical user interface (GUI) that displays resource utilization by counting resource utilization samples in buckets and illustrating those buckets in a stacked area chart. As such, the visualization system enables visualization of high-level trend of servers, data centers, and regions. Yet, every sample for every server for the entire day is still represented in the GUI.

One example technical advantage of the visualization process includes a new way for identifying underutilized capacity. For example, the visualization system identifies areas of underutilized capacity across different servers and generates a recommendation. In a further example, the visualization system provides instructions to one or more servers identified based on the GUI. The instructions can include server configuration settings that configure the servers to re-distribute a load from one server to another server.

In another example embodiment, a system and method for determining and generating a visualization of processor utilization is described. In one aspect, a computer-implemented method includes accessing a source data set that indicates processor utilization rates of a plurality of servers over a plurality of sampling periods, defining a target data set that includes a plurality of processor utilization range buckets corresponding to the plurality of sampling periods, updating the target data set based on the source data set by incrementing one of the plurality of processor utilization range buckets in response to a processor utilization rate corresponding to the processor utilization range of a processor utilization range bucket, generating a graphical user interface (GUI) based on the updated target data set, the GUI includes a stacked area chart indicating percentages of samples corresponding to the processor utilization range buckets over time, and distributing, based on the updated target data set, a load of from a first server of the plurality of servers to a second server of the plurality of servers based on the processor utilization range bucket of the first server and the processor utilization range bucket of the second server.

As a result, one or more of the methodologies described herein facilitate solving the technical problem of processor under-utilization and over-utilization. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed. One or more application servers 104 provide server-side functionality via a network 102 to a networked user device, in the form of a client device 106. A user 130 operates the client device 106. The client device 106 includes a web client 112 (e.g., a browser), a programmatic client 108 (e.g., a computer resource visualization application, an email/calendar application such as Microsoft Outlook™) that is hosted and executed on the client device 106.

An Application Program Interface (API) server 120 and a web server 122 provide respective programmatic and web interfaces to application servers 104. A specific application server 118 hosts an enterprise application 124 and a visualization application 110. Both enterprise application 124 and visualization application 110 include components, modules and/or applications.

The enterprise application 124 includes a server-side resource visualization application, a server-side email/calendar enterprise application, a server-side instant message enterprise application, a server-side document authoring enterprise application, or a server-side shared document storage enterprise application. In one example, the enterprise application 124 enables users of an organization to collaborate and share document, messages, and other data (e.g., meeting information, common projects) with each other. For example, the user 130 at the client device 106 accesses and uses the enterprise application 124 to edit documents that are shared with other users of the same enterprise. In another example, the client device 106 accesses and uses the enterprise application 124 to retrieve or send messages or emails to and from other peer users of the enterprise. Other examples of enterprise application 124 includes enterprise systems, content management systems, and knowledge management systems.

The visualization application 110 communicates with the enterprise application 124. In one example, the visualization application 110 accesses resource utilization data from the application server 118 based on processor usage at the application server 118, at the application servers 104, or at other servers connected to the application server 118. In another example, the visualization application 110 measures resource utilization data based on operations of the enterprise application 124. In yet another example, the visualization application 110 accesses user operation data of the enterprise application 124. The user operation data includes data points that measure the frequency, dates, times of users operating the enterprise application, types of documents being accessed or shared by users of the enterprise application, users calendar data from the enterprise application, communication data between users of the enterprise application, and enterprise organization data.

In another example embodiment, the visualization application 110 communicates with the programmatic client 108 and provides visualization of the resource/processor utilization of the application servers 104. In another example, the visualization application 110 provides server configuration settings/instructions to the application server 118 or the servers of the application servers 104. For example, the visualization application 110 receives server configuration instructions from the user 130 via the programmatic client 108 or web client 112. In another example, the web client 112 communicates with the visualization application 110 and enterprise application 124 via the programmatic interface provided by the Application Program Interface (API) server 120.

The visualization application 110 accesses processor utilization data from the processor of the application servers 104, forms a source data set based on the processor utilization data. The visualization application 110 performs a binning process on the source data set to generate a target data set. The visualization application 110 generates a graphical user interface (GUI) based on the target data set. For example, the GUI includes a stacked area chart that identifies areas of resource under-utilizations.

In another example embodiment, the visualization application 110 generates a server configuration recommendation that identifies servers and corresponding time ranges. For example, the server configuration recommendation indicates re-allocating resources from the identified server to other servers during the identified time ranges. In another example, the visualization application 110 includes an interactive GUI element that identifies areas of under/over-utilization. The visualization application 110 generates a server configuration setting based on the identified areas. The interactive GUI element enables the user to interact with the chart and generate a server configuration request based on the user interaction and the identified under/over-utilized resources.

The visualization application 110 can also compute benchmark or threshold resource utilization based on previously generated charts. For example, the visualization application 110 determines a resource threshold based on historical processor utilization of the server farm. The visualization application 110 can also access resource utilization data from other server farms. The visualization application 110 generates a comparison GUI that illustrates a comparison of the server resources of the server farm with the resources of other server farms.

Examples of server configuration settings include changes to how the servers of the application servers 104 operate. For example, the server configuration setting indicates that one or more servers are to re-allocate their workload to other servers during an identified time range. In other example, the server configuration setting indicates that certain tasks (e.g., task A but not task C) may be offloaded or performed at other servers during specific times.

Other examples embodiments of the operations of the visualization application 110 include generating a dialog box pre-populated with information based on the recommended action (e.g., pre-filled with parameters of a configuration setting feature of the enterprise application 124, the application server 118, or other servers of the application servers 104). The user 130 only has to click on one button to configure the application servers 104 with the new settings.

The application server 118 is shown to be communicatively coupled to database servers 126 that facilitates access to an information storage repository or databases 128. In an example embodiment, the databases 128 include storage devices that store information to be processed by the enterprise application 124 and the visualization application 110.

Additionally, a third-party application 116 may, for example, store another part of the enterprise application 124, or include a cloud storage system. For example, the third-party application 116 stores other resource utilization data related to the application servers 104. In another example, the third-party server 114 is associated with another server farm that is different from the server farm of the application servers 104. The third-party application 116 executing on a third-party server 114, is shown as having programmatic access to the application server 118 via the programmatic interface provided by the Application Program Interface (API) server 120. For example, the third-party application 116, using information retrieved from the application server 118, may supports one or more features or functions on a website hosted by the third party.

Figure 2:
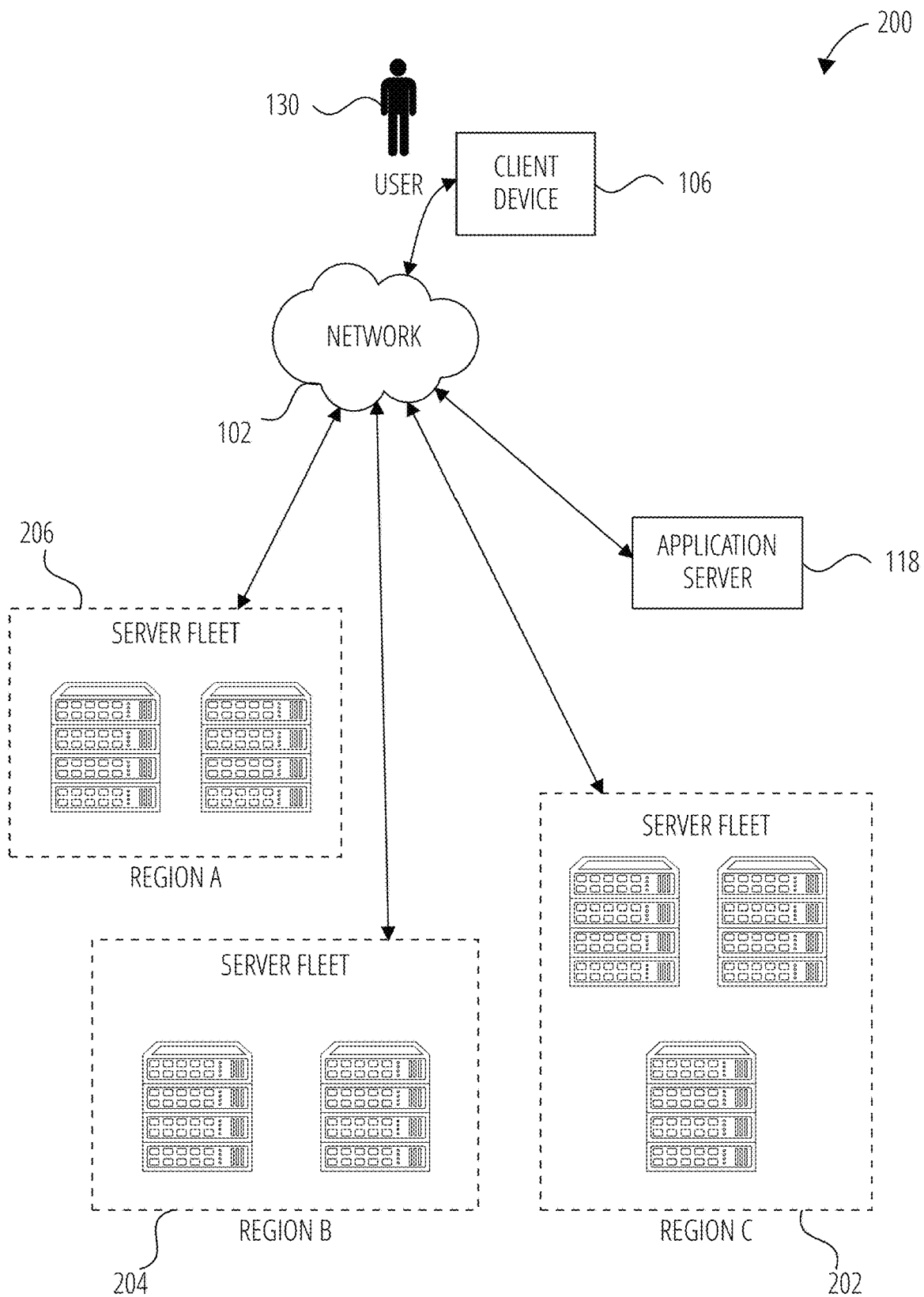
FIG. 2 is a diagrammatic representation of another networked environment in which the present disclosure may be deployed, in accordance with some example embodiments.

FIG. 2 is a diagrammatic representation of a network environment 200 in which some example embodiments of the present disclosure may be implemented or deployed. The application server 118 provides server-side functionality via a network 102 to the networked user device (e.g., client device 106).

The application server 118 communicates with server fleets (e.g., server fleet 202, server fleet 204, server fleet 206) that are located in different geographic regions (e.g., region A, region B, region C). The application server 118 monitors the resource utilization of the processors of each server fleet. In another example, the application server 118 monitors resource utilization of processors of each fleet of a server fleet.

In another example, the application server 118 generates a first type of visualization based on a first sampling period (e.g., 5 minute samples) for server fleet 206 in region A and a second visualization based on a second sampling period (e.g., 30 minute samples) for server fleet 204 in region B. In another example, the application server 118 generates the first type of visualization based on the first sampling period (e.g., 5 minute samples) for a first server from the server fleet 206 and for a second server from the server fleet 206.

The application server 118 generates a visualization of the resource utilization across the servers of a server fleet. In another example, the user 130 operates a GUI element in the visualization to configure a setting of a corresponding server or server fleet. For example, the configuration setting can direct one or more servers to offload processing tasks from one processor of a server to another server during a defined period of time (e.g., offload n tasks from server X in server fleet 206 to server Y in server fleet 206 between the hours of 2 pm GMT and 4 pm GMT, or redistribute processor activities between servers from region A to region C between the hours of 10 am GMT and 12 pm GMT).

Figure 3:
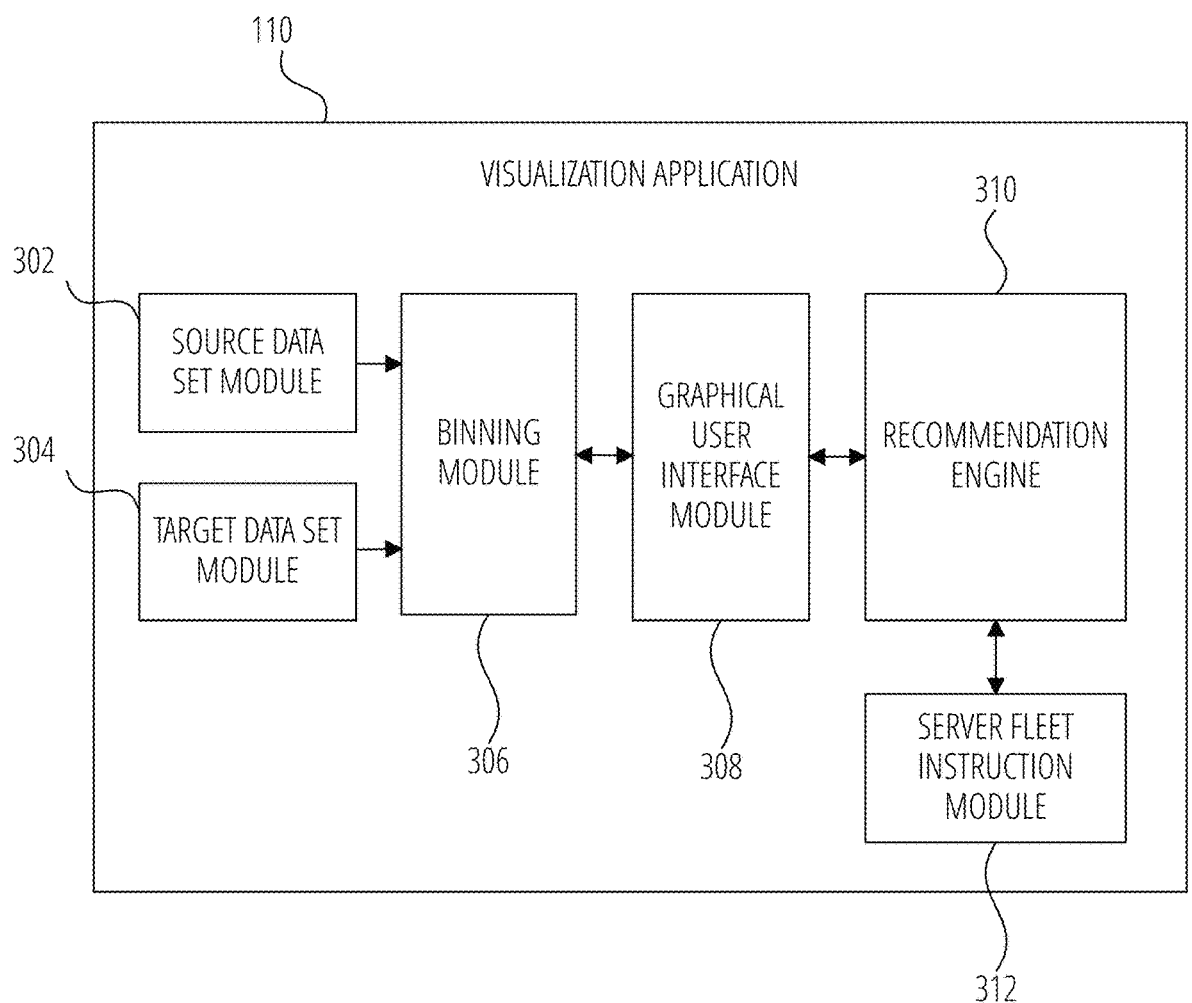
FIG. 3 is a block diagram illustrating a visualization module in accordance with one example embodiment.

FIG. 3 is a block diagram illustrating an enterprise performance engine in accordance with one example embodiment. The visualization application 110 includes a source data set module 302, a target data set module 304, a binning module 306, a graphical user interface module 308, a recommendation engine 310, and a server fleet instruction module 312.

The source data set module 302 accesses processor data from the server fleet. In particular, the source data set module 302 generates a source data set based on the processor data. The source data set contains a processor (also referred to as a Central Processing Unit, CPU) utilization sampled every X minutes (e.g., 5 minutes) for every physical/virtual machine in the server fleet for an entire day. In one example embodiment, each row of the source data set includes the following attributes/properties:

Service: the service identifier that the virtual machine is deployed for (e.g., types of applications).

Region: the geographic region of the world where the virtual machine is deployed.

Valid: the identifier of the virtual machine.

TimeStamp: the date and time at which the 5-minute sample was taken.

CpuValue: an integer value between 0-100, that represents the average system CPU for the 5-minute window on the virtual machine.

The target data set module 304 forms a target data set corresponding to the source data set from the source data set module 302. For example, the target data set includes a row for every combination of Service, Region, and Time Window. In one example embodiment, each row of the target data set includes the following attributes/properties:

Service: the service identifier that the virtual machine is deployed for.

Region—the geographic region of the world where the virtual machine is deployed.

TimeStamp—the date and time for this 5-minute window.

Bucket10—the count of samples between 0-10% CPU.

Backet20—the count of samples between 10-20% CPU.

Bucket30—the count of samples between 20-30% CPU.

. . . up to

Backet100—the count of samples between 20-30% CPU.

The binning module 306 performs a binning process based on the source data set of source data set module 302 and the target data set of target data set module 304. The following illustrates an example embodiment of the binning process. The binning module 306 loops through each row of the source data set and performs the following two steps:

Step A (Find (or create) the target row): the binning module 306 loops through the set of target rows that was created up to this point and finds the target row that represents this sample. The binning module 306 verifies that the service attribute and the region attribute match. The binning module 306 further verifies that the TimeStamp attribute of the source data set falls within the 5-minute window represented in the target data set TimeStamp row. If the binning module 306 determines that a target row does not already exist in the target data set for this sample (if this is the first source row with that key combination), the binning module 306 creates the new target row with a count of zero in every bucket and stores it in the target data set.

Step B (Update the target row): in the target row, the binning module 306 identifies which of the buckets the CPU sample falls into, and increments that bucket value by 1. For example, if the binning module 306 determines that the source sample has a CPU value of "5", the binning module 306 increments the target property "Bucket10". Once the binning module 306 finishes iterating through all samples in the source data set, the target data set is now ready to be visualized.

Figure 10:
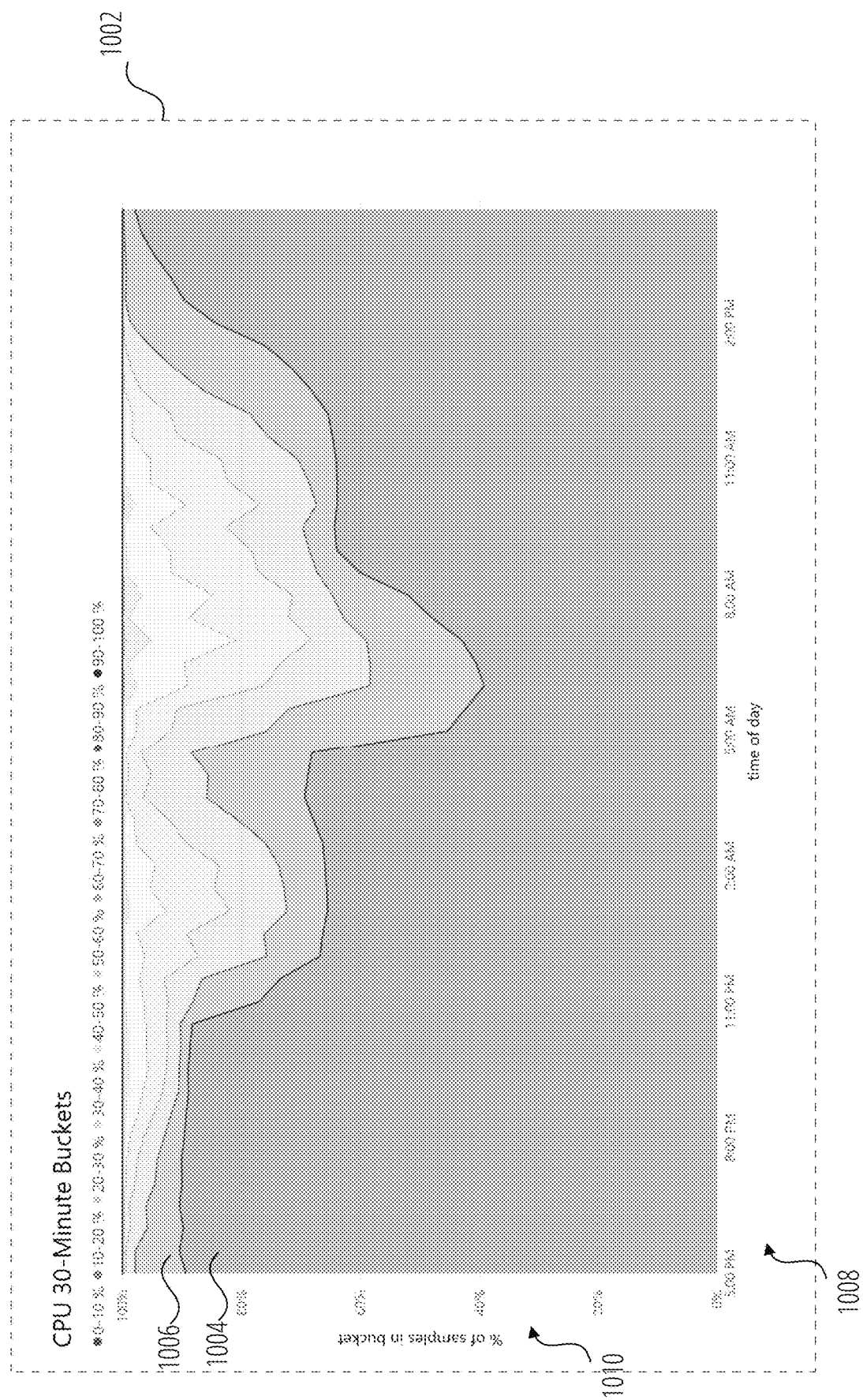
FIG. 10 illustrates an example of a graphical user interface illustrating a visualization of resource utilization in accordance with one example embodiment.
Figure 11:
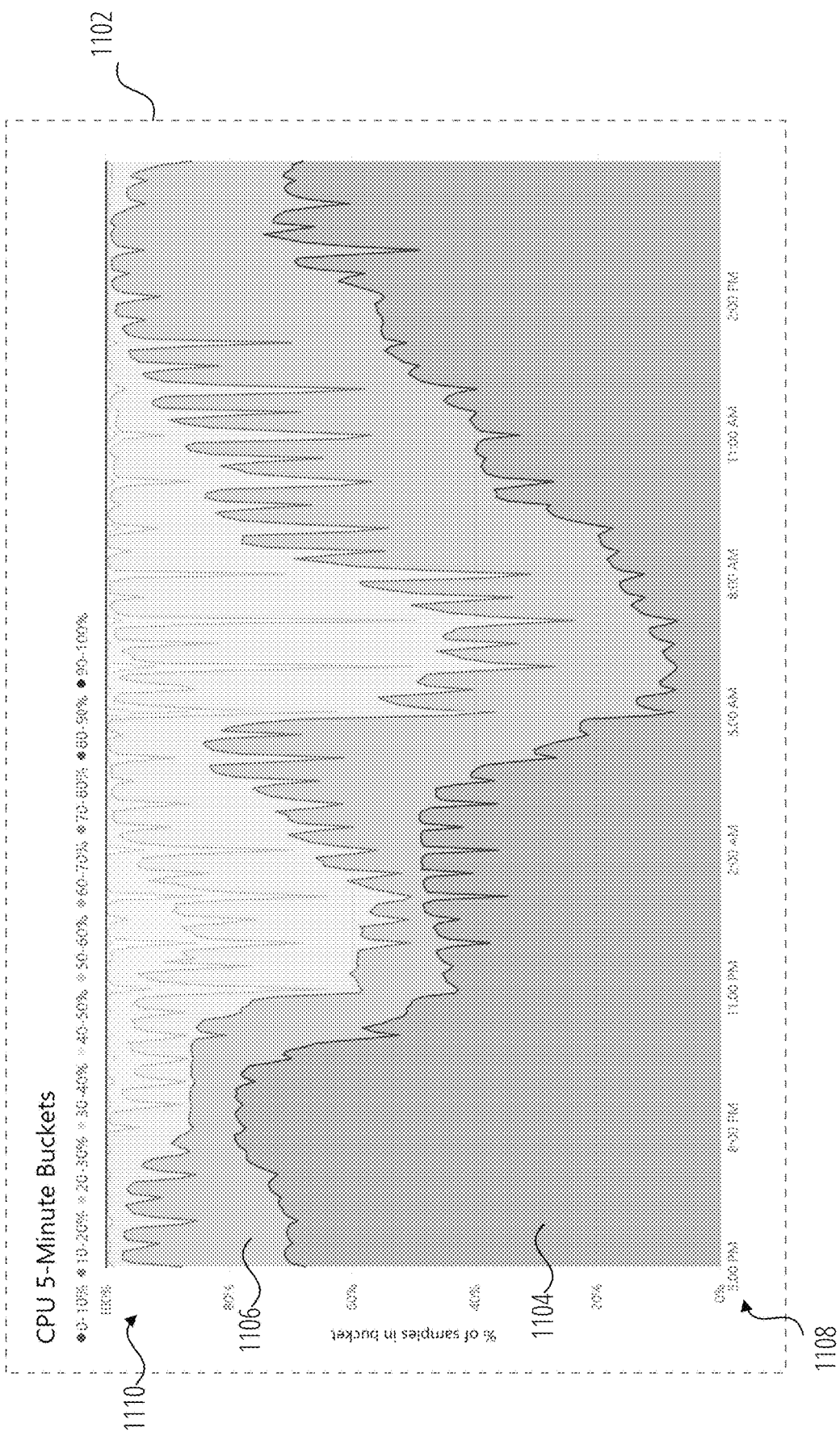
FIG. 11 illustrates an example of a graphical user interface illustrating a visualization of resource utilization in accordance with one example embodiment.

The graphical user interface module 308 generates a graphical user interface (GUI) to visualize the target data set. In one example, the GUI includes a stacked chart that displays processor utilization up to 100%. FIG. 10 and FIG. 11 illustrate examples of a stacked chart. In one example embodiment, the graphical user interface module 308 identifies areas of processor under-utilization (e.g., processor utilization below a preset threshold) or processor over-utilization (e.g., processor utilization above a preset threshold). For example, the graphical user interface module 308 visually emphasizes those regions in the stacked chart. In another example, the graphical user interface module 308 includes an interactive GUI element that allows the user to select and identify regions of the interest. Once the user 130 identifies a region of interest, the graphical user interface module 308 retrieves information associated with the region of interest (e.g., server A, B, C between 3 am and 6 am GMT).

The recommendation engine 310 generates a recommendation based on the identified areas of under-utilization or over-utilization. For example, the recommendation engine 310 generates a recommendation notification to re-distribute workload from one processor to another processor during specific periods of times. In another example, the recommendation engine 310 generates server load configuration setting to an identified server. The server load configuration setting instructs the server to offload or reallocate tasks/activities between certain hours to other servers. In another example, the recommendation engine 310 generates server configuration settings based on the identified region (e.g., offload activities for server A, B, C between 3 am and 6 am GMT).

The server fleet instruction module 312 provides the server load configuration setting to the identified server. In another example, the server fleet instruction module 312 generates server configuration settings to the identified server based on the recommendation from the recommendation engine 310 or the region of interest identified in the chart by the user 130.

Figure 4:
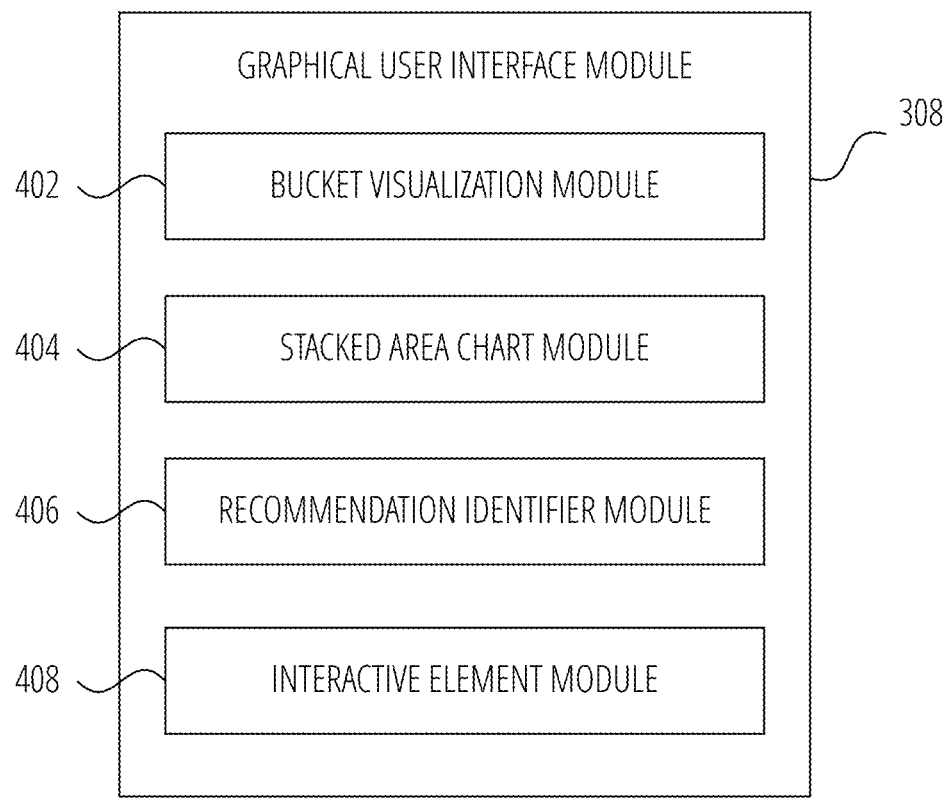
FIG. 4 is a block diagram illustrating a graphical interface module in accordance with one example embodiment.

FIG. 4 is a block diagram illustrating a graphical interface module in accordance with one example embodiment. The graphical user interface module 308 includes a bucket visualization module 402, a stacked area chart module 404, a recommendation identifier module 406, and an interactive element module 408. The bucket visualization module 402 generates a chart for each bucket (e.g., 10-20% CPU bucket/group). The stacked area chart module 404 assembles the charts for each bucket and combines them into a stacked chart. Those of ordinary skills in the art will recognize that other types of chart or graphical display can be used to illustrate the data in the target data set.

The recommendation identifier module 406 includes a visual element in the chart that identifies an area of interest. For example, the recommendation identifier module 406 highlights or draw a boundary around an area of interest on the chart. In another example, the recommendation identifier module 406 generates a recommendation that is displayed next to the highlighted area/region on the chart. The interactive element module 408 generates a user interactive GUI element that enables the user 130 to select or identify a region of interest. For example, the user 130 uses a drawing element to identify an area in the chart. The recommendation identifier module 406 generates a recommendation of a configuration setting based on the area identified in the chart by the user 130.

Figure 5:
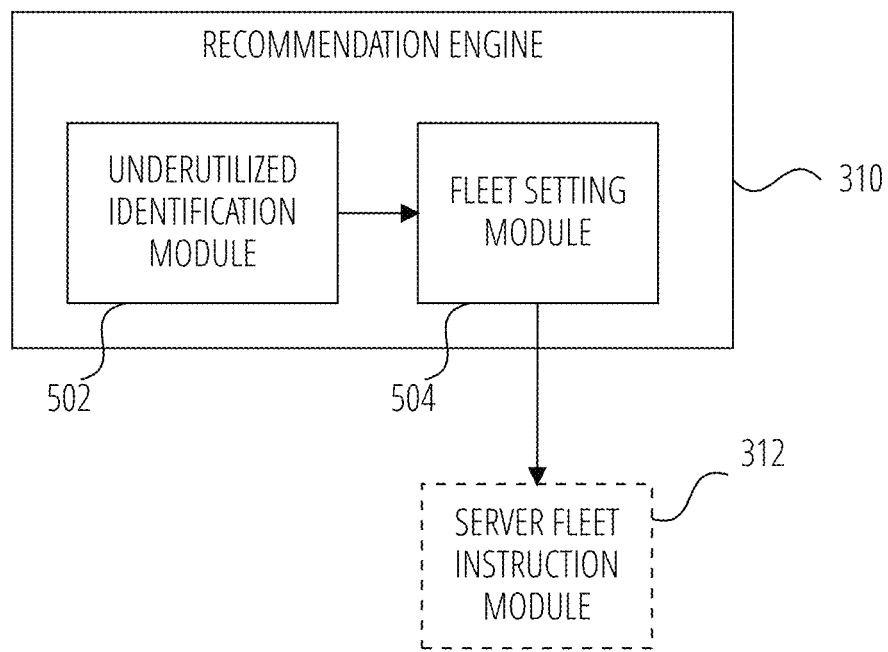
FIG. 5 is a block diagram illustrating a recommendation engine in accordance with one example embodiment.

FIG. 5 is a block diagram illustrating a recommendation engine in accordance with one example embodiment. The recommendation engine 310 includes an underutilized identification module 502 and a fleet setting module 504. The underutilized identification module 502 identifies an area of underutilized resources. The fleet setting module 504 generates fleet server configuration settings for the corresponding servers during specific periods of time. The fleet setting module 504 communicates the configuration settings to the server fleet instruction module 312. The server fleet instruction module 312 identifies the corresponding servers and provides the configuration settings to the identified servers.

Figure 6:
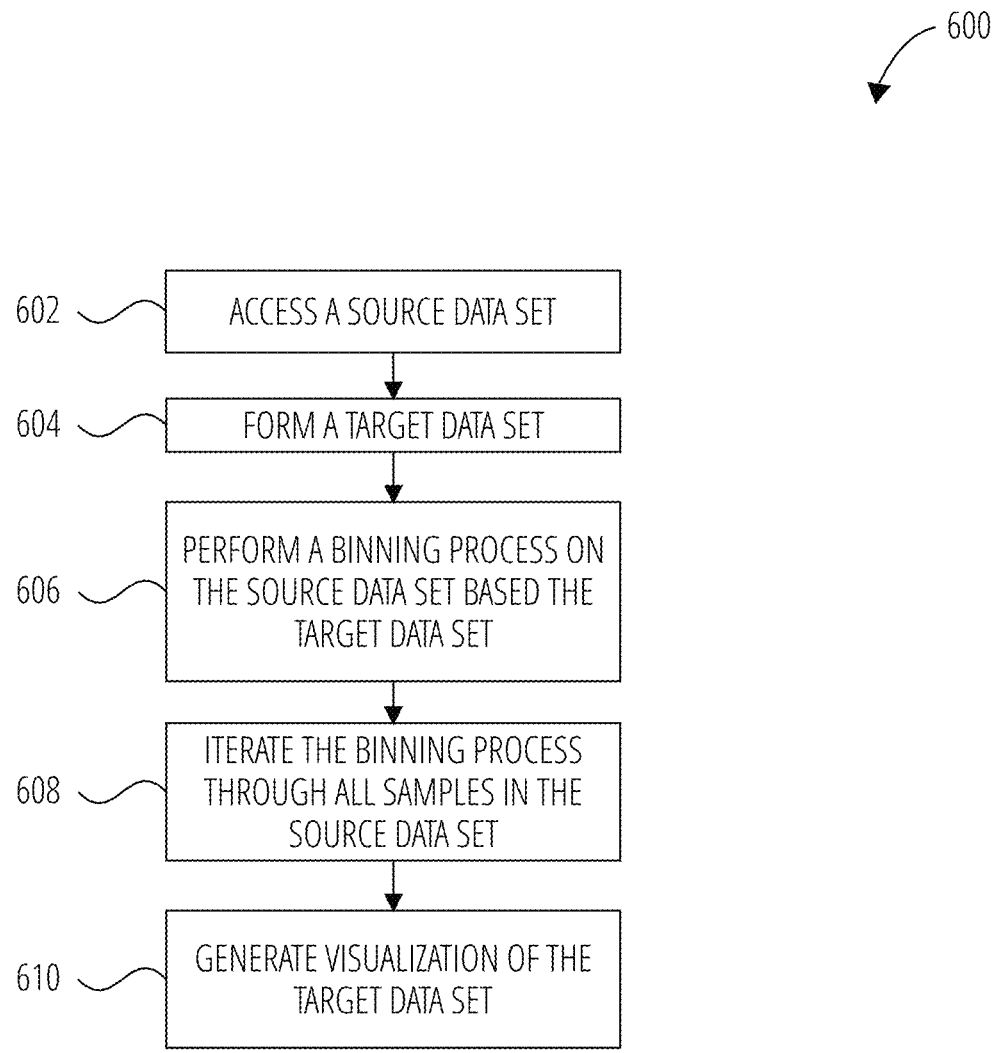
FIG. 6 is a flow diagram illustrating a method for generating a visualization of resource utilization in accordance with one example embodiment.

FIG. 6 is a flow diagram illustrating a method for generating a visualization of resource utilization in accordance with one example embodiment. Operations in the method 600 may be performed by the visualization application 110, using components (e.g., modules, engines) described above with respect to FIG. 3. Accordingly, the method 600 is described by way of example with reference to the visualization application 110. However, it shall be appreciated that at least some of the operations of the method 600 may be deployed on various other hardware configurations or be performed by similar components residing elsewhere. For example, some of the operations may be performed at the client device 106.

In block 602, the visualization application 110 accesses a source data set. In block 604, the visualization application 110 forms a target data set. In block 606, the visualization application 110 performs a binning process on the source data set based the target data set. In block 608, the visualization application 110 iterates the binning process through all samples in the source data set. In block 610, the visualization application 110 generates visualization of the target data set.

Figure 7:
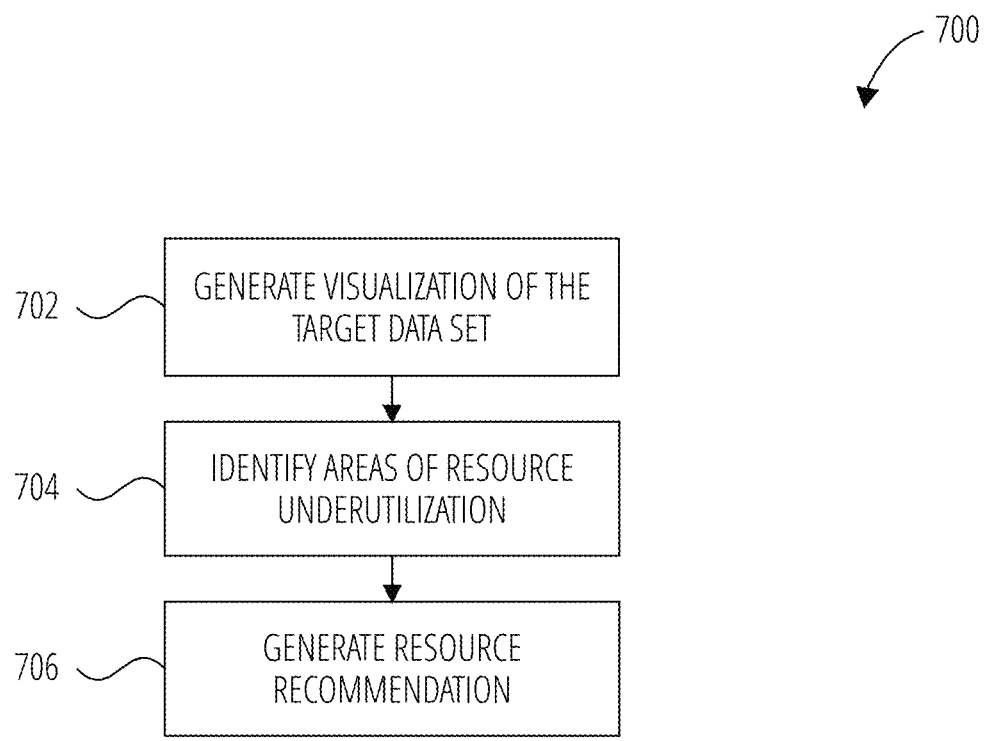
FIG. 7 is a flow diagram illustrating a method for generating a resource recommendation in accordance with one example embodiment.

FIG. 7 is a flow diagram illustrating a method for generating a resource recommendation in accordance with one example embodiment. Operations in the method 700 may be performed by the visualization application 110, using components (e.g., modules, engines) described above with respect to FIG. 3. Accordingly, the method 700 is described by way of example with reference to the visualization application 110. However, it shall be appreciated that at least some of the operations of the method 700 may be deployed on various other hardware configurations or be performed by similar components residing elsewhere. For example, some of the operations may be performed at the client device 106.

In block 702, the graphical user interface module 308 generates visualization of the target data set (e.g., stacked chart). In block 704, identify areas of resource underutilization. In block 706, the recommendation engine 310 generates resource recommendation.

Figure 8:
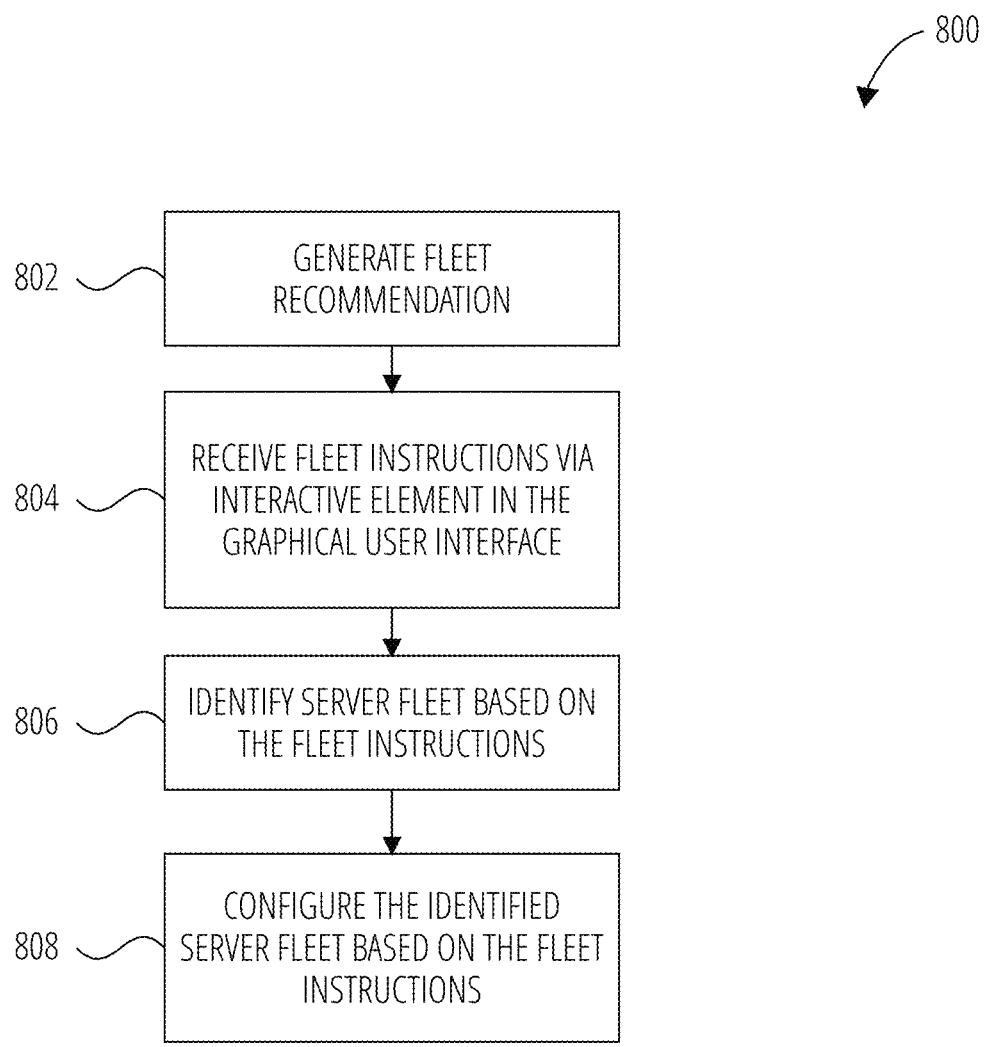
FIG. 8 is a flow diagram illustrating a method for configuring a server fleet in accordance with one example embodiment.

FIG. 8 is a flow diagram illustrating a method for configuring a server fleet in accordance with one example embodiment. Operations in the method 800 may be performed by the visualization application 110, using components (e.g., modules, engines) described above with respect to FIG. 3. Accordingly, the method 800 is described by way of example with reference to the visualization application 110. However, it shall be appreciated that at least some of the operations of the method 800 may be deployed on various other hardware configurations or be performed by similar components residing elsewhere. For example, some of the operations may be performed at the client device 106.

In block 802, the recommendation engine 310 generates a fleet recommendation. In block 804, the graphical user interface module 308 receives fleet instructions via interactive element in the graphical user interface. In block 806, the server fleet instruction module 312 identifies server fleet based on the fleet instructions. In block 808, the server fleet instruction module 312 configures the identified server fleet based on the fleet instructions.

Figure 9:
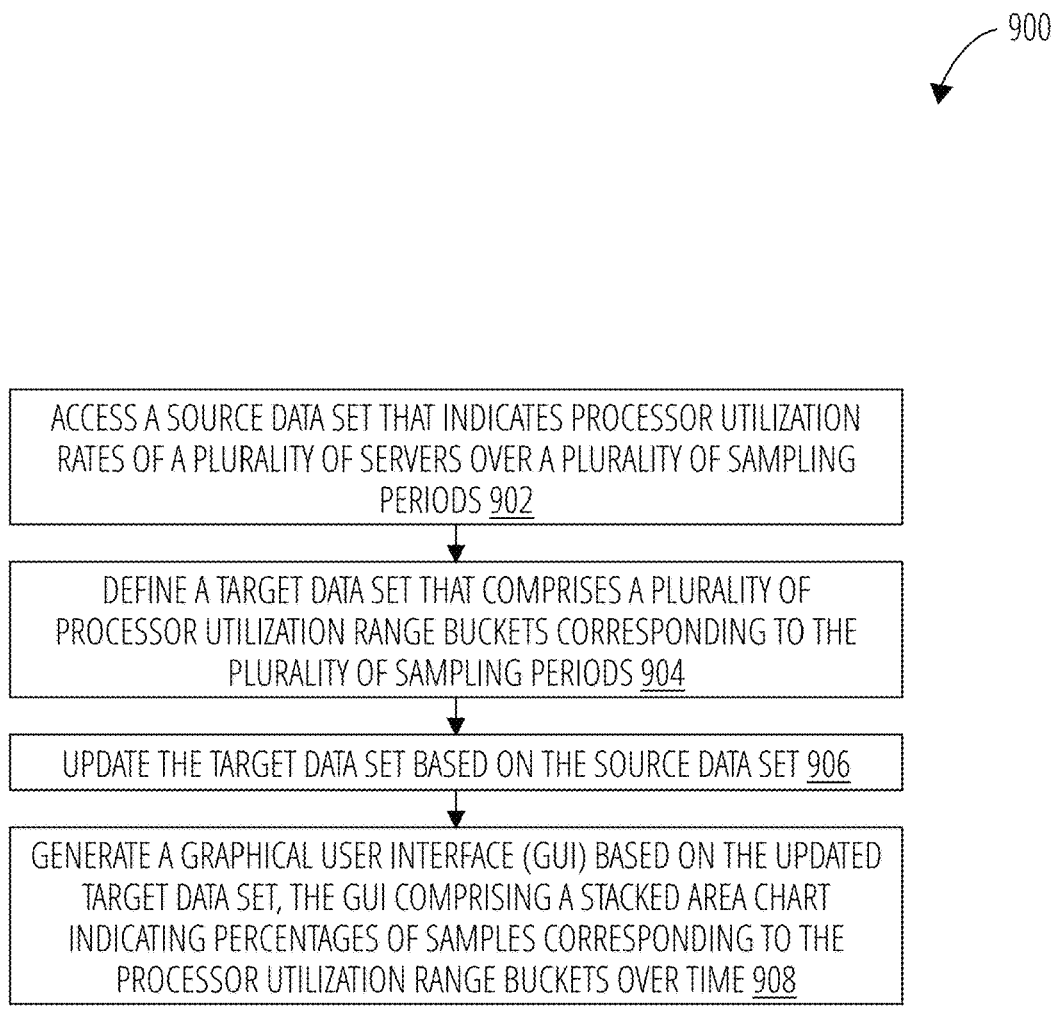
FIG. 9 illustrates a routine in accordance with one embodiment.

FIG. 9 illustrates a routine 900 in accordance with one embodiment. In block 902, routine 900 accesses a source data set that indicates processor utilization rates of a plurality of servers over a plurality of sampling periods. In block 904, routine 900 defines a target data set that comprises a plurality of processor utilization range buckets corresponding to the plurality of sampling periods. In block 906, routine 900 updates the target data set based on the source data set. In block 908, routine 900 generates a graphical user interface (GUI) based on the updated target data set, the GUI comprising a stacked area chart indicating percentages of samples corresponding to the processor utilization range buckets over time.

FIG. 10 illustrates an example of a graphical user interface 1002 illustrating a visualization of resource utilization in accordance with one example embodiment. The graphical user interface 1002 includes a stacked chart that displays the different buckets (e.g., bucket 1004, bucket 1006) that represent processor utilization. The bucket 1004 and bucket 1006 are based on 30-minute processing use samples. The horizontal axis 1008 represents time. The vertical axis 1010 represents the percentage of samples in a bucket.

FIG. 11 illustrates an example of a graphical user interface 1102 illustrating a visualization of resource utilization in accordance with one example embodiment. The graphical user interface 1102 includes a stacked chart that displays the different buckets (e.g., bucket 1104, bucket 1106) that represent processor utilization. The bucket 1004 and bucket 1006 are based on 30-minute processing use samples. The horizontal axis 1108 represents time. The vertical axis 1110 represents the percentage of samples in a bucket.

Figure 12:
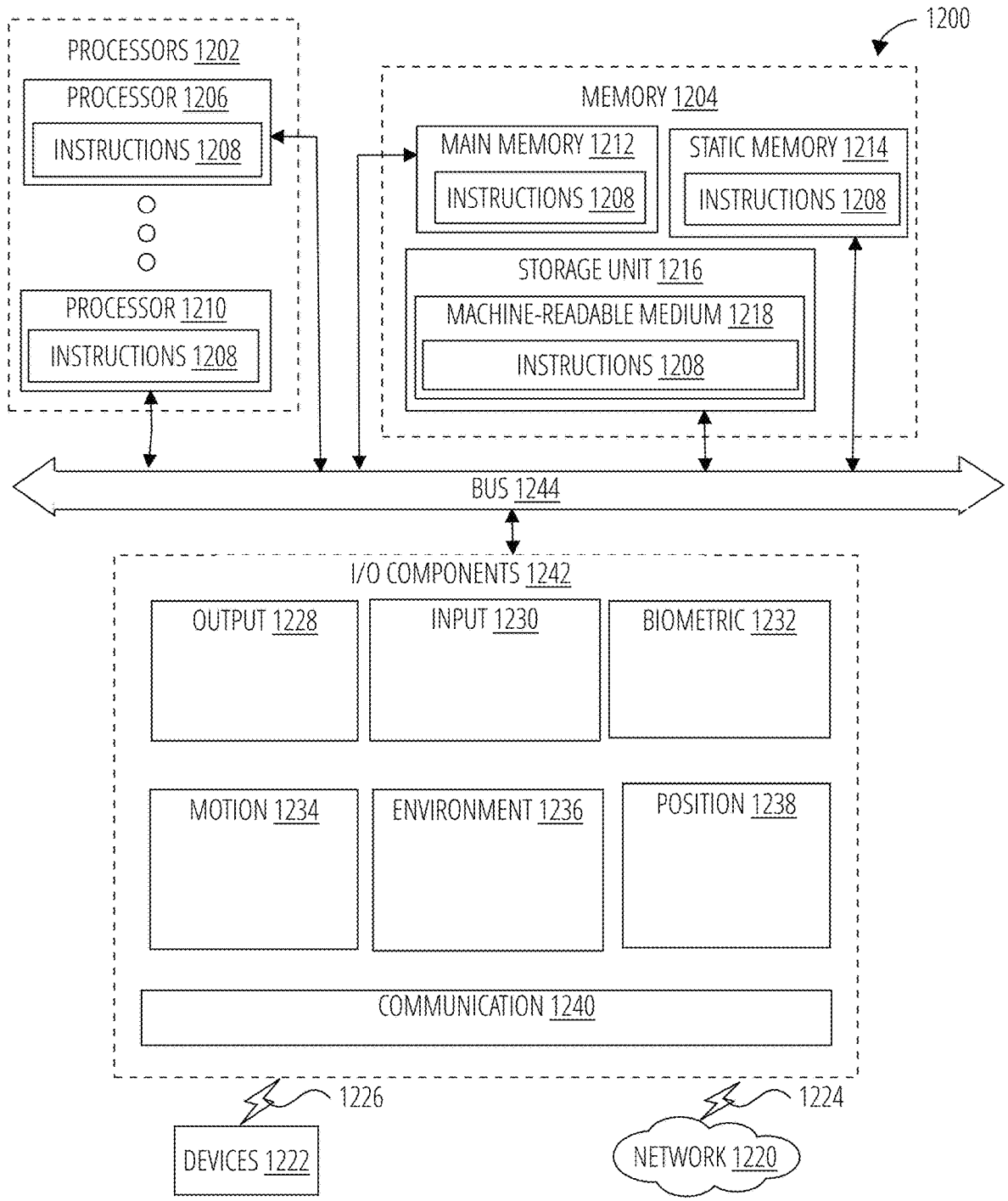
FIG. 12 is a diagrammatic representation of a machine in the form of a computer system within which a set of instructions may be executed for causing the machine to perform any one or more of the methodologies discussed herein, according to an example embodiment.

FIG. 12 is a diagrammatic representation of the machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein.

The machine 1200 may include processors 1202, memory 1204, and I/O components 1242, which may be configured to communicate with each other via a bus 1244. In an example embodiment, the processors 1202 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1206 and a processor 1210 that execute the instructions 1208. The term "processor" is intended to include multi-core processors that may comprise two or more independent processors (sometimes referred to as "cores") that may execute instructions contemporaneously. Although FIG. 12 shows multiple processors 1202, the machine 1200 may include a single processor with a single core, a single processor with multiple cores (e.g., a multi-core processor), multiple processors with a single core, multiple processors with multiples cores, or any combination thereof.

The memory 1204 includes a main memory 1212, a static memory 1214, and a storage unit 1216, both accessible to the processors 1202 via the bus 1244. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the processors 1202 (e.g., within the processor's cache memory), or any suitable combination thereof, during execution thereof by the machine 1200.

The I/O components 1242 may include a wide variety of components to receive input, provide output, produce output, transmit information, exchange information, capture measurements, and so on. The specific I/O components 1242 that are included in a particular machine will depend on the type of machine. For example, portable machines such as mobile phones may include a touch input device or other such input mechanisms, while a headless server machine will likely not include such a touch input device. It will be appreciated that the I/O components 1242 may include many other components that are not shown in FIG. 12. In various example embodiments, the I/O components 1242 may include output components 1228 and input components 1230. The output components 1228 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1230 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1242 may include biometric components 1232, motion components 1234, environmental components 1236, or position components 1238, among a wide array of other components. For example, the biometric components 1232 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1234 include acceleration sensor components (e.g., accelerometer), gravitation sensor components, rotation sensor components (e.g., gyroscope), and so forth. The environmental components 1236 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1242 further include communication components 1240 operable to couple the machine 1200 to a network 1220 or devices 1222 via a coupling 1224 and a coupling 1226, respectively. For example, the communication components 1240 may include a network interface component or another suitable device to interface with the network 1220. In further examples, the communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1222 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as location via Internet Protocol (IP) geolocation, location via Wi-Fi® signal triangulation, location via detecting an NFC beacon signal that may indicate a particular location, and so forth.

The various memories (e.g., memory 1204, main memory 1212, static memory 1214, and/or memory of the processors 1202) and/or storage unit 1216 may store one or more sets of instructions and data structures (e.g., software) embodying or used by any one or more of the methodologies or functions described herein. These instructions (e.g., the instructions 1208), when executed by processors 1202, cause various operations to implement the disclosed embodiments.

The instructions 1208 may be transmitted or received over the network 1220, using a transmission medium, via a network interface device (e.g., a network interface component included in the communication components 1240) and using any one of a number of well-known transfer protocols (e.g., hypertext transfer protocol (HTTP)). Similarly, the instructions 1208 may be transmitted or received using a transmission medium via the coupling 1226 (e.g., a peer-to-peer coupling) to the devices 1222.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

EXAMPLES

Example 1 is a computer-implemented method comprising: accessing a source data set that indicates processor utilization rates of a plurality of servers over a plurality of sampling periods; defining a target data set that comprises a plurality of processor utilization range buckets corresponding to the plurality of sampling periods; updating the target data set based on the source data set by incrementing one of the plurality of processor utilization range buckets in response to a processor utilization rate corresponding to the processor utilization range of a processor utilization range bucket; generating a graphical user interface (GUI) based on the updated target data set, the GUI comprising a stacked area chart indicating percentages of samples corresponding to the processor utilization range buckets over time; and distributing, based on the updated target data set, a load of from a first server of the plurality of servers to a second server of the plurality of servers based on the processor utilization range bucket of the first server and the processor utilization range bucket of the second server.

Example 2 includes example 1, wherein each processor utilization bucket identifies a processor utilization range over a sampling period, wherein the method comprises: identifying, in the GUI, the first server based on the plurality of processor utilization range buckets in the GUI.

Example 3 includes example 1, further comprising: generating a recommendation based on the GUI; receiving a server configuration setting via a GUI element in the GUI; and providing the server configuration setting to at least one of the plurality of servers.

Example 4 includes example 1, further comprising: identifying an area of processor under-utilization in the GUI, the area of processor under-utilization indicating a percentage of samples in a processor utilization range bucket being below a threshold.

Example 5 includes example 1, further comprising: identifying an area of processor over-utilization in the GUI, the area of processor over-utilization indicating a percentage of samples in a processor utilization range bucket being above a threshold.

Example 6 includes example 1, wherein the source data set indicates a periodic processor utilization sample in the plurality of servers.

Example 7 includes example 6, wherein each row of the source data set comprises a source service attribute, a source region attribute, an identifier of a virtual machine, a source time stamp attribute indicating a time the periodic processor utilization sample was taken, a processor value attribute that represents an average processor utilization rate within the periodic processor utilization sample.

Example 8 includes example 7, wherein each row of the target data set comprises a target service attribute, a target region attribute, a target time stamp attribute, a bucket attribute indicating a count of samples of processor utilization rates being within a processor utilization range bucket.

Example 9 includes example 8, wherein updating the target data set based on the source data set comprises: for each row of the source data set, identifying a target row from the target data set based on a value of the source service attribute matching a value of the target service attribute, and a value of the source region attribute matching a value of the target region attribute, and a value of the source time stamp being within a window defined by the target time stamp attribute; and updating the target row based on the processor utilization rate for each row of the source data set.

Example 10 includes example 8, wherein the stacked area chart indicates percentages of samples for each processor utilization range buckets over a 24-hour period.

Example 11 is a computing apparatus comprising: a processor; and a memory storing instructions that, when executed by the processor, configure the apparatus to perform operations comprising: access a source data set that indicates processor utilization rates of a plurality of servers over a plurality of sampling periods; define a target data set that comprises a plurality of processor utilization range buckets corresponding to the plurality of sampling periods; update the target data set based on the source data set by incrementing one of the plurality of processor utilization range buckets in response to a processor utilization rate corresponding to the processor utilization range of a processor utilization range bucket; generate a graphical user interface (GUI) based on the updated target data set, the GUI comprising a stacked area chart indicating percentages of samples corresponding to the processor utilization range buckets over time; and distribute, based on the updated target data set, a load of from a first server of the plurality of servers to a second server of the plurality of servers based on the processor utilization range bucket of the first server and the processor utilization range bucket of the second server.

Example 12 includes example 11, wherein each processor utilization bucket identifies a processor utilization range over a sampling period, wherein the operations comprise: identify, in the GUI, the first server based on the plurality of processor utilization range buckets in the GUI.

Example 13 includes example 11, wherein the instructions further configure the apparatus to: generate a recommendation based on the GUI; receive a server configuration setting via a GUI element in the GUI; and provide the server configuration setting to at least one of the plurality of servers.

Example 14 includes example 11, wherein the instructions further configure the apparatus to: identify an area of processor under-utilization in the GUI, the area of processor under-utilization indicating a percentage of samples in a processor utilization range bucket being below a threshold.

Example 15 includes example 11, wherein the instructions further configure the apparatus to: identify an area of processor over-utilization in the GUI, the area of processor over-utilization indicating a percentage of samples in a processor utilization range bucket being above a threshold.

Example 16 includes example 11, wherein the source data set indicates a periodic processor utilization sample in the plurality of servers.

Example 17 includes example 16, wherein each row of the source data set comprises a source service attribute, a source region attribute, an identifier of a virtual machine, a source time stamp attribute indicate a time the periodic processor utilization sample was taken, a processor value attribute that represents an average processor utilization rate within the periodic processor utilization sample.

Example 18 includes example 17, wherein each row of the target data set comprises a target service attribute, a target region attribute, a target time stamp attribute, a bucket attribute indicate a count of samples of processor utilization rates being within a processor utilization range bucket.

Example 19 includes example 18, wherein updating the target data set based on the source data set comprises: for each row of the source data set, identify a target row from the target data set based on a value of the source service attribute matching a value of the target service attribute, and a value of the source region attribute matching a value of the target region attribute, and a value of the source time stamp being within a window defined by the target time stamp attribute; and update the target row based on the processor utilization rate for each row of the source data set.

A non-transitory computer-readable storage medium, the computer-readable storage medium including instructions that when executed by a computer, cause the computer to: access a source data set that indicates processor utilization rates of a plurality of servers over a plurality of sampling periods; define a target data set that comprises a plurality of processor utilization range buckets corresponding to the plurality of sampling periods; update the target data set based on the source data set by incrementing one of the plurality of processor utilization range buckets in response to a processor utilization rate corresponding to the processor utilization range of a processor utilization range bucket; generate a graphical user interface (GUI) based on the updated target data set, the GUI comprising a stacked area chart indicating percentages of samples corresponding to the processor utilization range buckets over time; and distribute, based on the updated target data set, a load of from a first server of the plurality of servers to a second server of the plurality of servers based on the processor utilization range bucket of the first server and the processor utilization range bucket of the second server.

What is claimed is:

1. A computer-implemented method comprising:
 accessing a source data set that indicates processor utilization rates of a plurality of servers over a plurality of sampling periods;
 defining a target data set that comprises a plurality of processor utilization range buckets corresponding to the plurality of sampling periods;
 updating the target data set based on the source data set by incrementing one of the plurality of processor utilization range buckets in response to a processor utilization rate corresponding to the processor utilization range of a processor utilization range bucket;
 generating a graphical user interface (GUI) based on the updated target data set, the GUI comprising a stacked area chart indicating percentages of samples corresponding to the processor utilization range buckets over time; and
 distributing, based on the updated target data set, a load of from a first server of the plurality of servers to a second server of the plurality of servers based on the processor utilization range bucket of the first server and the processor utilization range bucket of the second server.

2. The computer-implemented method of claim 1, wherein each processor utilization bucket identifies a processor utilization range over a sampling period, wherein the method comprises: identifying, in the GUI, the first server based on the plurality of processor utilization range buckets in the GUI.

3. The computer-implemented method of claim 1, further comprising:
 generating a recommendation based on the GUI;
 receiving a server configuration setting via a GUI element in the GUI; and
 providing the server configuration setting to at least one of the plurality of servers.

4. The computer-implemented method of claim 1, further comprising:
 identifying an area of processor under-utilization in the GUI, the area of processor under-utilization indicating a percentage of samples in a processor utilization range bucket being below a threshold.

5. The computer-implemented method of claim 1, further comprising:
 identifying an area of processor over-utilization in the GUI, the area of processor over-utilization indicating a percentage of samples in a processor utilization range bucket being above a threshold.

6. The computer-implemented method of claim 1, wherein the source data set indicates a periodic processor utilization sample in the plurality of servers.

7. The computer-implemented method of claim 6, wherein each row of the source data set comprises a source service attribute, a source region attribute, an identifier of a virtual machine, a source time stamp attribute indicating a time the periodic processor utilization sample was taken, a processor value attribute that represents an average processor utilization rate within the periodic processor utilization sample.

8. The computer-implemented method of claim 7, wherein each row of the target data set comprises a target service attribute, a target region attribute, a target time stamp attribute, a bucket attribute indicating a count of samples of processor utilization rates being within a processor utilization range bucket.

9. The computer-implemented method of claim 8, wherein updating the target data set based on the source data set comprises:
 for each row of the source data set, identifying a target row from the target data set based on a value of the source service attribute matching a value of the target service attribute, and a value of the source region attribute matching a value of the target region attribute, and a value of the source time stamp being within a window defined by the target time stamp attribute; and
 updating the target row based on the processor utilization rate for each row of the source data set.

10. The computer-implemented method of claim 8, wherein the stacked area chart indicates percentages of samples for each processor utilization range buckets over a 24-hour period.

11. A computing apparatus comprising:
 a processor; and
 a memory storing instructions that, when executed by the processor, configure the apparatus to perform operations comprising:
  access a source data set that indicates processor utilization rates of a plurality of servers over a plurality of sampling periods;
  define a target data set that comprises a plurality of processor utilization range buckets corresponding to the plurality of sampling periods;
  update the target data set based on the source data set by incrementing one of the plurality of processor utilization range buckets in response to a processor utilization rate corresponding to the processor utilization range of a processor utilization range bucket;
  generate a graphical user interface (GUI) based on the updated target data set, the GUI comprising a stacked area chart indicating percentages of samples corresponding to the processor utilization range buckets over time; and
  distribute, based on the updated target data set, a load of from a first server of the plurality of servers to a second server of the plurality of servers based on the processor utilization range bucket of the first server and the processor utilization range bucket of the second server.

12. The computing apparatus of claim 11, wherein each processor utilization bucket identifies a processor utilization range over a sampling period, wherein the method comprises: identify, in the GUI, the first server based on the plurality of processor utilization range buckets in the GUI.

13. The computing apparatus of claim 11, wherein the instructions further configure the apparatus to:
 generate a recommendation based on the GUI;
 receive a server configuration setting via a GUI element in the GUI; and
 provide the server configuration setting to at least one of the plurality of servers.

14. The computing apparatus of claim 11, wherein the instructions further configure the apparatus to:
 identify an area of processor under-utilization in the GUI, the area of processor under-utilization indicating a percentage of samples in a processor utilization range bucket being below a threshold.

15. The computing apparatus of claim 11, wherein the instructions further configure the apparatus to:

identify an area of processor over-utilization in the GUI, the area of processor over-utilization indicating a percentage of samples in a processor utilization range bucket being above a threshold.

16. The computing apparatus of claim 11, wherein the source data set indicates a periodic processor utilization sample in the plurality of servers.

17. The computing apparatus of claim 16, wherein each row of the source data set comprises a source service attribute, a source region attribute, an identifier of a virtual machine, a source time stamp attribute indicate a time the periodic processor utilization sample was taken, a processor value attribute that represents an average processor utilization rate within the periodic processor utilization sample.

18. The computing apparatus of claim 17, wherein each row of the target data set comprises a target service attribute, a target region attribute, a target time stamp attribute, a bucket attribute indicate a count of samples of processor utilization rates being within a processor utilization range bucket.

19. The computing apparatus of claim 18, wherein updating the target data set based on the source data set comprises:
for each row of the source data set, identify a target row from the target data set based on a value of the source service attribute matching a value of the target service attribute, and a value of the source region attribute matching a value of the target region attribute, and a value of the source time stamp being within a window defined by the target time stamp attribute; and
update the target row based on the processor utilization rate for each row of the source data set.

20. A non-transitory computer-readable storage medium, the computer-readable storage medium including instructions that when executed by a computer, cause the computer to:
access a source data set that indicates processor utilization rates of a plurality of servers over a plurality of sampling periods;
define a target data set that comprises a plurality of processor utilization range buckets corresponding to the plurality of sampling periods;
update the target data set based on the source data set by incrementing one of the plurality of processor utilization range buckets in response to a processor utilization rate corresponding to the processor utilization range of a processor utilization range bucket;
generate a graphical user interface (GUI) based on the updated target data set, the GUI comprising a stacked area chart indicating percentages of samples corresponding to the processor utilization range buckets over time; and
distribute, based on the updated target data set, a load of from a first server of the plurality of servers to a second server of the plurality of servers based on the processor utilization range bucket of the first server and the processor utilization range bucket of the second server.

* * * * *